United States Patent [19]
Lumley et al.

[11] Patent Number: 5,587,526
[45] Date of Patent: Dec. 24, 1996

[54] PROOF MASS SUPPORT AND SENSING SYSTEM

[75] Inventors: John M. Lumley, Cambridge, United Kingdom; Ho J. Paik, College Park, Md.

[73] Assignee: Oxford Instruments (UK) Limited, Oxon, England

[21] Appl. No.: 409,300

[22] Filed: Mar. 24, 1995

[30] Foreign Application Priority Data

Mar. 30, 1994 [GB] United Kingdom ............... 9406347
Sep. 28, 1994 [GB] United Kingdom ............... 9419649

[51] Int. Cl.$^6$ .................................................. G01V 7/02
[52] U.S. Cl. ................. 73/382 G; 73/382 R; 73/514.31
[58] Field of Search ................. 73/382 G, 514.17, 73/514.31, 383 R

[56] References Cited

U.S. PATENT DOCUMENTS 4,170,904 10/1979 Fischell et al. .
4,841,772 6/1989 Paik ........................................ 73/382 G
5,224,380 7/1993 Paik .

FOREIGN PATENT DOCUMENTS 9007131 6/1990 Australia .

*Primary Examiner*—John E. Chapman

[57] ABSTRACT

A proof mass support system has a pair of alignment coils for controlling the rest position of an elongate proof mass. The alignment coils are constructed to provide a levitation force when they carry electric currents which varies along the length of the proof mass. The relative strength of the electric currents are tuned in the alignment coils to cause the proof mass to take up a predetermined orientation with respect to one or more degrees of freedom defined by the alignment coils. In an alternative, one or more anti-rotation coils may be arranged to apply a restoring force to the proof mass when electric currents pass therethrough. The proof mass is formed so as to cooperate with the restoring force which acts against rotation of the proof mass away from a predetermined orientation. The system is typically provided as part of a superconducing accelerometer or gravity gradiometer.

25 Claims, 13 Drawing Sheets

• Ly12−
∘ Ly12+

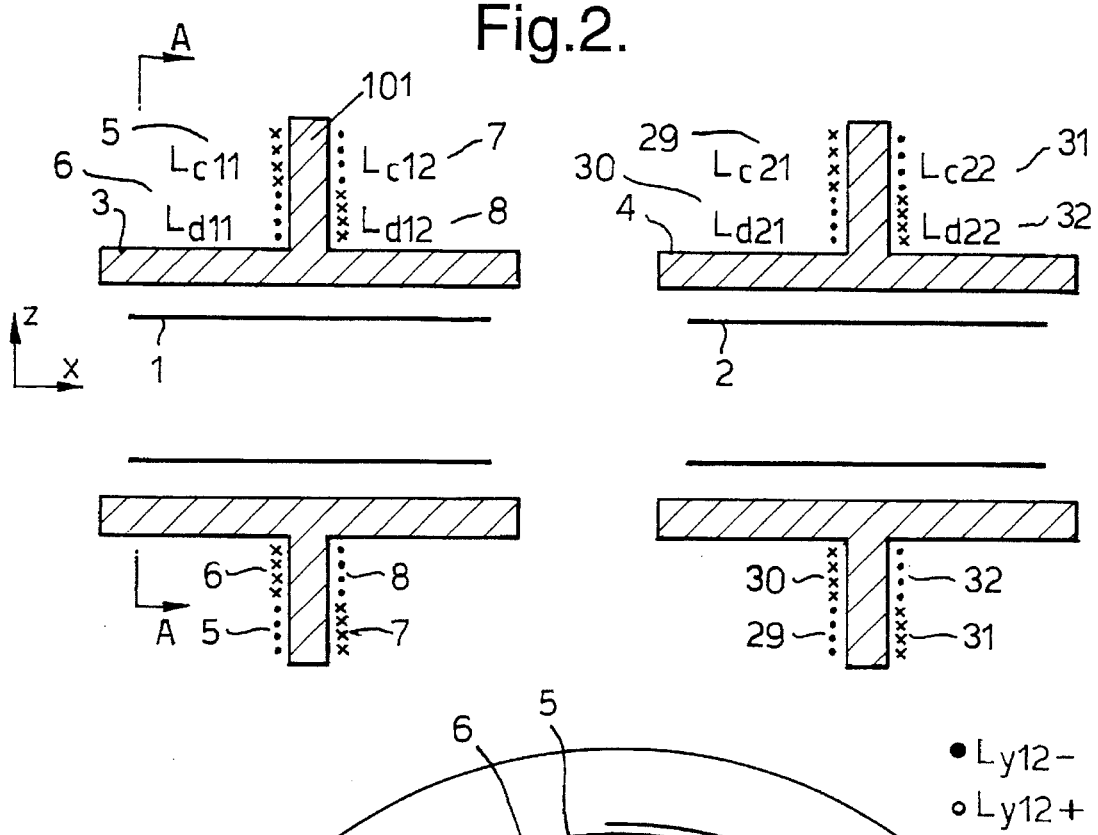
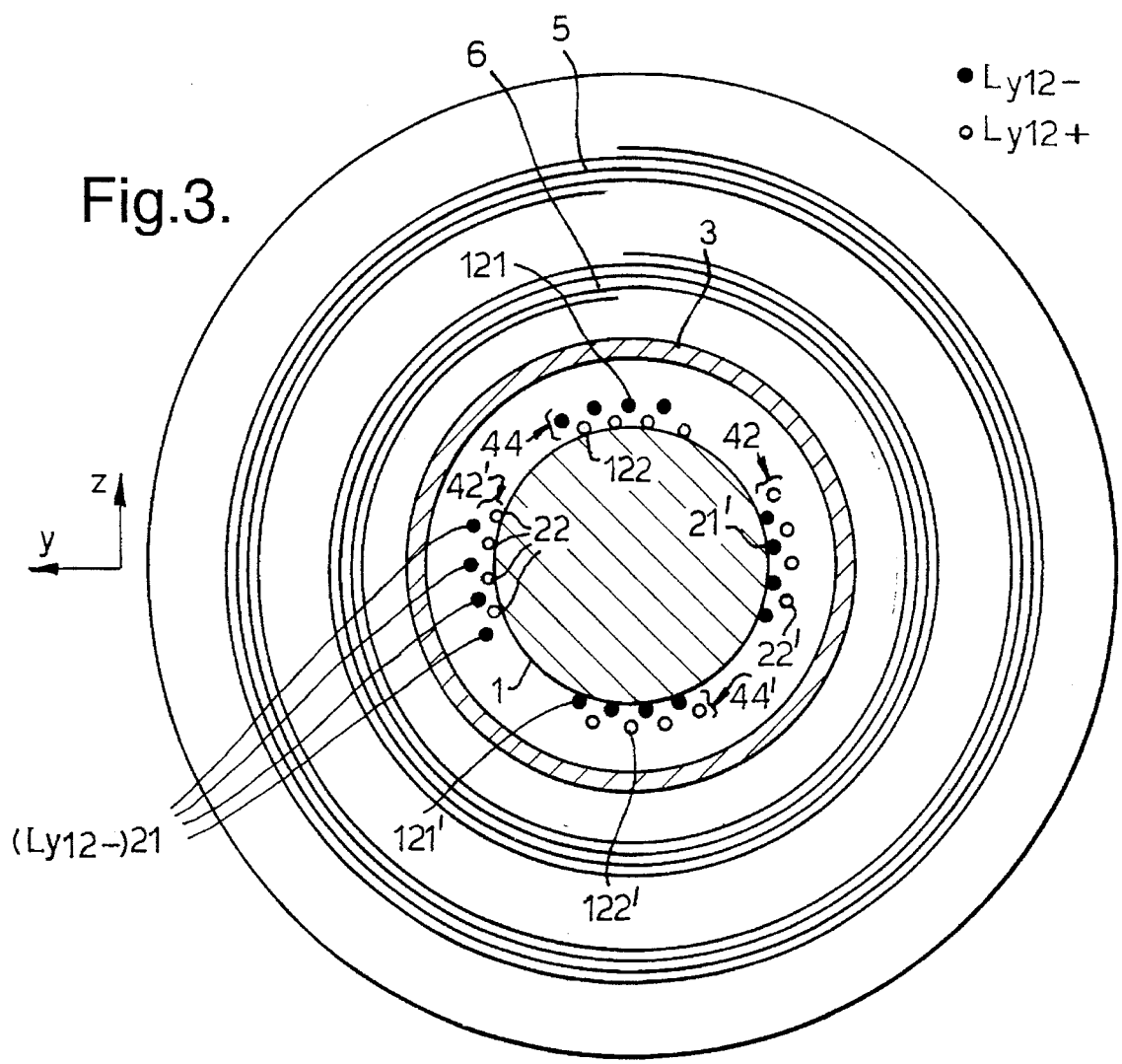

PROOF MASS SUPPORT AND SENSING SYSTEM

FIELD OF THE INVENTION

This invention relates to a proof mass support and sensing system, particularly for use in a superconducting accelerometer or gravity gradiometer.

DESCRIPTION OF THE PRIOR ART

Known superconducting gravity gradiometers (SGGs) make use of the extreme sensitivity of superconducting quantum interference devices (SQUIDs) to measure magnetic flux induced in the device by gravity signals. The gradiometer incorporates an accelerometer including a superconducting proof mass and associated support system, whose displacement modulates the inductance of a sensing coil. Since the magnetic flux in a closed loop sensing coil circuit must remain constant, a change in inductance in the sensing coil results in a current flowing, which is sensed by SQUID input coils.

U.S. Pat. No. 4,841,772 describes a gradiometer in which the sensing and levitation coils are mounted on the same side of the proof mass to overcome the effects of a temperature rise.

It is desirable that the gradiometer should reject common-mode signals but its ability to do this is dependent upon minimizing alignment errors. Conventional proof mass support systems have no means of minimizing these alignment errors.

SUMMARY OF THE INVENTION

In accordance with the present invention we provide a proof mass support system comprising a pair of alignment coils for controlling the rest position of a proof mass; wherein the alignment coils are constructed to provide a levitation force, when they carry electric currents, which varies along the length of the proof mass; and means for tuning the relative strength of the electric currents in the alignment coils to cause the superconducting proof mass to take up a predetermined orientation with respect to one or more degrees of freedom defined by the alignment coils.

It has been found that the proof mass can be sensitively aligned by providing tunable alignment coils which allow fine adjustment of the position of the proof mass. This is typically achieved by providing pairs of alignment coils which apply a levitation force with a resultant moment about the center of mass of the proof mass (i.e. imparting a rotational as well as linear acceleration to the proof mass). Typically one of the coils applies a clockwise rotational force about a given axis, and the other coil provides an anti-clockwise rotational force about the same axis. This allows the resultant rotational force of the pair of coils to be controlled by varying their relative strengths.

Typically the system is provided as part of an accelerometer or gravity gradiometer comprising two or more proof masses each having an associated adjustable support system, whereby alignment errors can be substantially overcome, ie. the orientation of the proof masses can be controlled to ensure that each proof mass is substantially collinear or perpendicular with respect to the other.

In the case of an accelerometer comprising a single proof mass only, the adjustable support system according to the invention allows the sensitive axis of the accelerometer to be precisely aligned with respect to the gravitational field.

Typically the proof mass is formed of a superconducting material such as Niobium and is levitated due to the Meissner effect. Alternatively the proof mass may be a non-superconducting conductor, which is levitated by using eddy currents.

Where the proof mass is superconducting, the alignment coils are preferably also formed of superconducting material (such as Niobium or Niobium/Titanium), which allows the electric currents to be persistent superconducting currents.

Alternatively the alignment coils may be formed of normal metal and carry ac currents for eddy current levitation.

In the following specification a set of orthogonal x, y and z axes is used and is generally defined in the following way. The alignment coils provide a levitation force which varies in the x-direction. Generally this direction is parallel with the sensitive axis of the proof mass. Typically the proof mass is generally cylindrical and the x-axis lies along the rotational axis of the cylinder. The y and z axes extend perpendicular to the x-axis and where an external gravity field is present (for instance the Earth's Gravity $\bar{g}$) the z axis is generally defined by taking g to point in the negative z direction. These axes define the degrees of freedom which are controlled by the alignment coils.

Typically the alignment coils comprise elongate coils which extend along the length of the proof mass and are constructed such that when they carry electric current they provide a levitation force which varies along their length.

In this case the alignment coils typically comprise elongate meander-pattern coils which extend in a first direction, and provide a levitation force in a second direction perpendicular to the first direction which varies along the length of the coil. This means that rotation about an axis substantially orthogonal to the first and second directions is controllable by tuning the relative strength of the currents in the pair of coils, each extending in substantially the same direction and whose levitation force vary along their length in opposite senses. For instance, the pair of coils may comprise upper z-axis alignment coils (providing a levitation force in the negative z direction) which extend in the x direction and which provide a variable force along the x axis which can be varied to rotate the proof mass around the y axis. Typically, the support system will also comprise a pair of lower z-axis alignment coils (providing levitation force in the positive z direction) and an additional two pairs of left and right y-axis alignment coils all of which also extend in the x direction.

The levitation force provided by the elongate alignment coils may be varied by varying one or both of the distance from the coil to the surface of the proof mass or the number of turns per unit length of the coil.

The distance from the coil to the surface of the proof mass may be varied by winding the coil on the surface of a former having grooves with a depth which increases along the length of the former.

The number of turns per unit length may be varied by providing meander pattern coils with a taper which varies along the required direction.

Preferably, the gradiometer further comprises a former having machined grooves in which the alignment coils are wound, wherein the depth of the grooves increases by a constant amount along the former's length. The variation in depth produces a cross-over effect between the pair of alignment coils.

Typically, the alignment coils are wound on a substantially cylindrical former.

In one example, the alignment coils comprise interleaved sets of multiple parallel wires.

By winding the interleaved sets of alignment coils with several parallel wires around a surface of the coil former, the distance between current reversals can be made larger and the proof mass can be levitated further, the spring constants reduced, the dynamic range increased and the machining tolerances reduced.

Alternatively, the alignment coils comprise a pair of non-parallel, interleaved coils wound in the grooves.

In another example, the coils may comprise a pair of substantially parallel tapered coils.

The alignment coils may be made from any suitable superconducting material such as Niobium, and the former may be made of quartz, macor, sapphire or any other suitable insulator. Alternatively, the alignment coils comprise copper coated Niobium or Niobium/Titatium wire wound on and bonded to a copper former.

In an alternative to the alignment coils discussed above (which provide a variable levitation force along their length), the pair of coils may be conventional coils (which will typically provide a substantially constant levitation force along their length) which are displaced with respect to the center of mass of the proof mass.

The support system typically also comprises sensing coils to detect movement of the proof mass along the x axis (which in this case is the "sensitive axis" of the accelerometer) which also provide levitation force in the positive and negative x directions. The x-axis sensing coils are typically pancake coils which provide a low spring constant as required along the sensitive axis.

This full complement of x,y and z sensing and alignment coils allows the proof mass to be levitated in a gravitational field which points in any direction.

Typically, the proof mass is substantially cylindrical.

In the case of a gravity gradiometer comprising two proof masses, typically each proof mass is provided with one or more differential-mode sensing coils and one or more common mode sensing coils. The differential-mode sensing coils are connected to a differential-mode sensing circuit which detects differential movement of the two proof masses. The common-mode sensing coils are connected to a common-mode sensing circuit which detects common movement (i.e. in the same direction). Preferably, the common-mode and differential-mode sensing circuits are substantially decoupled from each other. This allows the small differential signal to be accurately measured independently of the large common mode background. Typically, the common-mode sensing circuit includes passive damping means and the differential-mode sensing circuit includes active damping means.

Conventional proof mass support systems allow rotation of the proof mass about the sensitive axis, which causes measurement errors.

According to a second aspect of the present invention we provide a proof mass support system comprising at least one proof mass; and a set of coils at least one of which is arranged to apply a levitation force to the proof mass and at least one of which comprises an anti-rotation coil arranged to apply a restoring force to the proof mass when electric currents pass through the anti-rotation coil; wherein the proof mass is formed so as to cooperate with the restoring force whereby the restoring force urges the proof mass towards a predetermined rotational orientation.

The support system according to the second aspect of the invention provides an alternative method of controlling the orientation of the proof mass. The levitation coil or coils providing the levitation force may be conventional or may comprise alignment coils according to the first aspect of the present invention.

Typically the proof mass is formed of superconducting material with indentations which tend to line up with the anti-rotation coils and adopt a low energy orientation. For instance the anti-rotation coils may comprise pancake coils which extend in the x direction and line up with grooves in the proof mass which also extend in the x direction. This causes the proof mass to adopt a low energy orientation which substantially prevents rotation of the proof mass about the x axis.

The anti-rotation force coils may also provide a levitation force in which case additional levitation force coils may not be required.

Typically the anti-rotation coils extend along the length of the proof mass and are slightly shorter than the proof mass length. In this way the geometry produces a negative spring.

Conventional accelerometers or gravity gradiometers having two proof masses only measure acceleration of each proof mass along a single sensitive axis.

According to a third aspect of the present invention we provide an accelerometer or gravity gradiometer comprising first and second proof masses each having an associated sensing system comprising (i) a first sensing coil or coils oriented with respect to the proof mass in order to sense acceleration of the proof mass in a first direction parallel to the separation of the proof masses;

(ii) a second sensing coil or coils oriented with respect to the proof mass in order to sense acceleration of the proof mass in a second direction; and, (iii) a third sensing coil or coils oriented with respect to the proof mass in order to sense acceleration of the proof mass in a third direction.

This allows further acceleration or gravity gradient components to be measured.

Typically the second direction is orthogonal to the first direction, and the third direction is orthogonal to both the first and second directions.

Typically the first sensing coil or coils associated with each proof mass are connected to a circuit or circuits which measure linear differential and common-mode acceleration of the proof masses along the first direction. Typically the second sensing coil or coils associated with each proof mass are connected to a circuit or circuits which measure differential and common-mode acceleration of the proof masses along the second direction. The common-mode signal gives the linear acceleration of the proof masses along the second direction. The differential-mode signal gives the rotational acceleration of the proof masses about the third axis.

Likewise the third sensing coil or coils associated with each proof mass are typically connected to a circuit or circuits which measure the linear acceleration of the proof mass along the third direction and the rotational acceleration about the second direction.

By combining three gravity gradiometers or accelerometers according to the third aspect of the invention, a tensor gravity gradiometer can be constructed which measures all components of the gravity gradient tensor.

Typically the second and third sets of sensing coils comprise anti-rotation coils according to the second aspect of the invention. That is, the anti-rotation coils of the two proof masses in a gradiometer or two-component accelerometer may be combined as part of the sensing circuits for radial linear and angular accelerations.

The following comments relate to systems according to all aspects of the present invention.

Preferably, each proof mass has a large surface area to volume ratio and levitation of the proof mass against gravity occurs in substantially all orientations.

Typically, each proof mass is substantially cylindrical.

In addition to the levitation coils according to the first and second aspects of the invention, a cantilever spring may also be provided for additional support to the proof mass.

Typically the proof mass comprises a main body section with one or more rings extending therefrom, and a surface of the or each ring remote from the main body section is curved and a coil is located radially outwardly of the surface of the ring such that, in use, a negative spring is formed. An alternative method of forming a negative spring is to provide a set of concave alignment coils which levitate the proof mass and produce an unstable equilibrium in use such that, in use, a negative spring is formed.

One or more of the three aspects of the invention may be incorporated in a wide variety of accelerometer and gravity gradiometer configurations, including the following:

1) Single proof mass accelerometer.
2) Inline gravity gradiometer (comprising two proof masses with their sensitive axis collinear).
3) Three-axis gravity gradiometer (comprising three inline gravity gradiometers with their sensitive axis in the three orthogonal directions).
4) Two-component accelerometer (comprising two proof masses with their sensitive axes perpendicular to their separation).
5) Cross-component gravity gradiometer (comprising a pair of two-component accelerometers oriented orthogonal to each other).
6) Differential accelerometer (accelerometer with two concentric proof masses with the same sensitive axis and identical centres of mass).
7) Six-axis accelerometer (comprising three linear and three angular accelerometers).
8) Tensor Gravity Gradiometer (comprising three inline and three cross-component gradiometers).

BRIEF DESCRIPTION OF THE DRAWINGS

An example of a gradiometer in accordance with the present invention will now be described with reference to the accompanying drawings, in which:

FIG. 2 is a longitudinal section through part of a gradiometer incorporating a proof mass support system according to the first aspect of the invention;

FIG. 3 is a transverse section along a line A—A in FIG. 2;

For purposes of identification, the coils in the following description are variously described as "alignment coils" "sensing coils" and "anti-rotation coils" in order to indicate their primary function. However in some cases these coils may provide additional functions such as levitation.

DESCRIPTION OF THE PREFERRED EMBODIMENT

Figure 1:
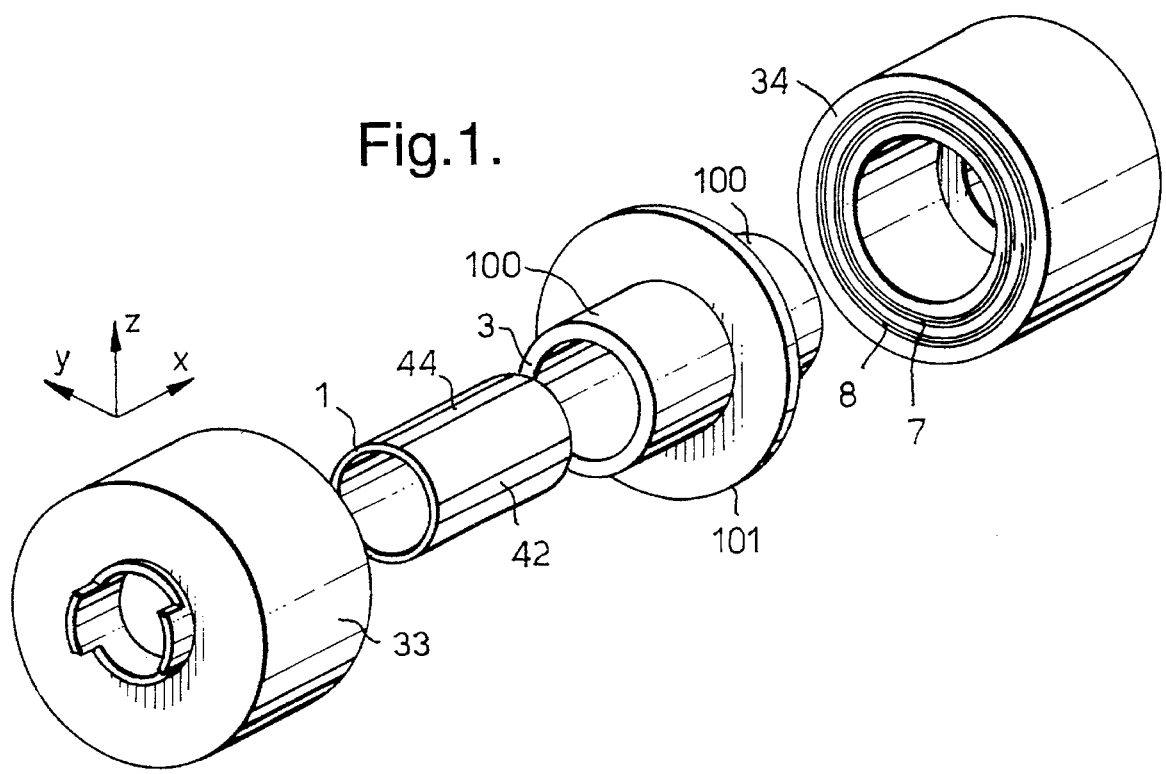
FIG. 1 is an exploded view of part of a gradiometer incorporating a proof mass support system according to the first aspect of the present invention.

FIG. 1 is an exploded view of an accelerometer including a proof mass support system according to the invention. The accelerometer comprises an inner former 1 on which are mounted superconducting y- and z-axis alignment coils 42,44 (and 42', 44' on opposite sides not shown) which extend in the x direction and beyond the edges of a cylindrical superconducting Niobium proof mass 3 positioned on the former 1. X-axis sensing coils 7,8 are wound on outer formers 34. Further x-axis sensing coils 5,6 (not shown in FIG. 3) are wound on the outer former 33. The x-axis coils 5,6,7,8 are typically pancake coils, i.e. substantially planar spirals of wire.

The proof mass shape shown in FIG. 1 (a cylindrical shell main body section 100 with a ring or band 101 on the outside) gives a large surface-to-volume ratio allowing levitation of the proof mass in all orientations against gravity and is a relatively stiff structure for all degrees of freedom. This configuration also allows sensing of movement in the x-direction, and application of a negative spring (as will be shown later). More than one ring 101 may be provided on the main body section, for instance a ring may be provided on each end.

In use the accelerometer is cooled to liquid helium temperature to ensure superconductivity.

FIG. 2 is a section through a pair of accelerometers for use in a gravity gradiometer. The y- and z-axis alignment coils are omitted for clarity. Respective inner formers 1,2 are provided and proof masses 3,4 are positioned radially outwardly of the inner formers. Outer formers 33,34 (FIG. 1, not shown in FIG. 2) support x-axis sensing coils, for example, pancake coils for proof mass 3 $L_{c11}$, $L_{d11}$, $L_{c12}$, and $L_{d12}$, (5,6,7,8 respectively). Likewise, additional outer formers (33', 34' shown in FIG. 15) support x-axis sensing pancake coils for proof mass 4 $L_{c21}$, $L_{d21}$, $L_{c22}$, and $L_{d22}$, (29,30,31,32 respectively). The coils shown in FIG. 2 each have four turns. However, more or less turns may be chosen as required for levitation and sense circuit requirements.

Figure 4:
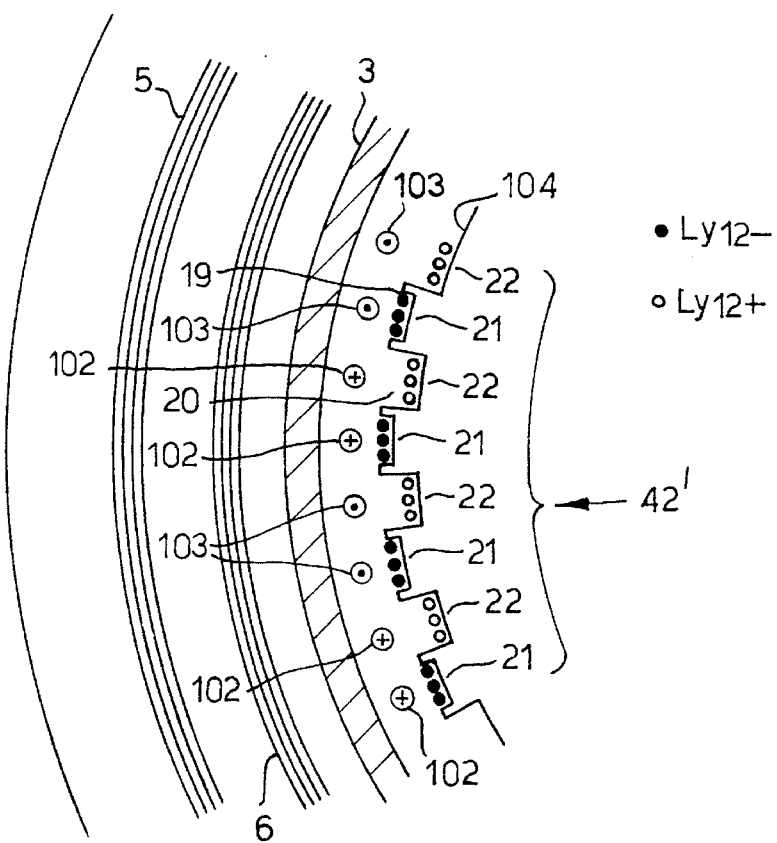
FIG. 4 is a more detailed view of part of the section of FIG. 3.

FIG. 3 is a view partially in section along the line A—A in FIG. 2 schematically illustrating the relationship of the x-axis sensing coils 5,6 and the four pairs of y- and z- axis alignment coils 42,42' and 44,44' respectively. The pairs of y- and z-axis alignment coils are indicated generally at 42 (right hand pair of y-coils $L_{y11\pm}$), 42' (left hand pair of y-coils $L_{y12\pm}$), 44 (upper pair of z-coils $L_{z12\pm}$) and 44' (lower pair of z-coils $L_{z11\pm}$). Each pair of coils comprises a pair of interleaved meander pattern coils (e.g. 21 ($L_{y12+}$) and 22 ($L_{y12-}$) in the case of the left hand pair of y-coils 42'). In FIG. 3 there is a general nomenclature for the alignment coils of $L_+$ and $L_-$, which indicates the direction of slope of the coils. FIG. 3 is a view taken from the negative x direction. For example, a $L_-$ index is given to indicate that as you travel in the positive x direction, the y or z-coordinate of the coil decreases with x. Therefore + and − indices do not refer to current flow, but rather to the direction of slant or taper (see FIGS. 8–12 below). FIG. 4 shows the left hand pair of y-alignment coils 42' in more detail. As can be seen in FIG. 4, each separate turn of the pair of coils 21 ($L_{y12-}$) and 22 ($L_{12+}$) comprises 3 wires (each carrying the same current in use as the other two associated wires).

The wires for coil 21 lie in grooves 19 and the wires for coil 22 lie in grooves 20 on the outer surface 104 of the former 1. The alternating directions of current flow through the turns 21,22 are indicated at 102 and 103.

In a conventional single coil gradiometer the proof mass will tend to align itself parallel to the radial levitation coil. In practice it is not possible to machine a perfect surface on a proof mass and this will have an error, such that there is a greater mass towards one end of the proof mass than the other. This mass will be supported by the same force all the way along and therefore the proof mass will not be horizontal. A machining error will also make the levitation coil deviate from the horizontal axis.

Figure 24:
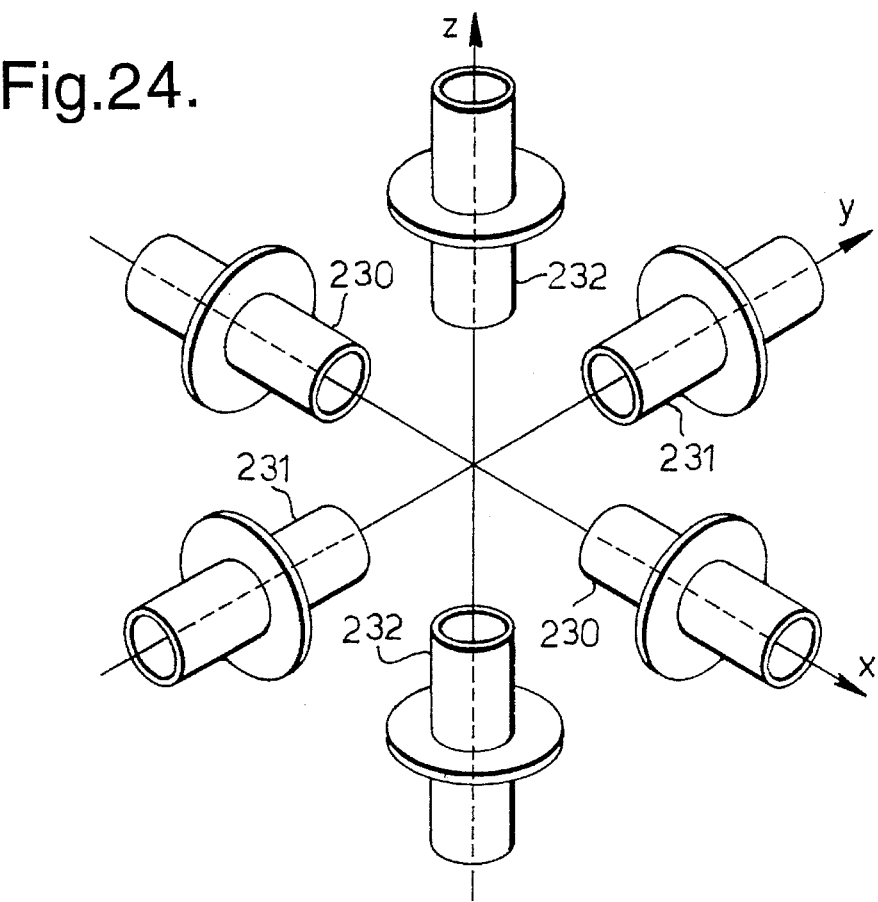
FIG. 24 illustrates the configuration of a multi-axis gradiometer.

In an example of the present invention, the same proof mass-coil configuration is provided in three orthogonal directions in a three-axis superconducting gravity gradiometer (SGG)—see FIG. 24. Referring back to FIGS. 2 and 3, $L_{d11}$, $L_{d12}$, 6,8 and $L_{c11}$, $L_{c12}$ 5,7 are superconducting spiral coils that levitate the proof mass with a levitation force having a low spring constant, and also detect the differential and common-mode motions respectively of proof mass 3 along the x direction. $L_{y12-}$ (21), $L_{y12+}$ (22) and $L_{y11-}$ (21'), $L_{y12+}$ (22') are superconducting meander-pattern alignment coils (with geometry to be defined later) that suspend proof mass 1 in the y-direction. Similarly, $L_{z11+}$, $L_{z11-}$, 44' $L_{z12+}$, $L_{z12-}$ 44 are superconducting meander-pattern alignment coils that suspend proof mass 3 in the z direction. The y- and z-alignment coils are designed to provide a force with high stiffness (i.e. high spring constant) in their respective directions. Corresponding coil arrangements are provided for proof mass 4. When the Earth's gravitational acceleration is in the z direction, the z-axis coils provide the levitation force against gravity. In general, when the sensitive x-axis points in an arbitrary direction with respect to the Earth's gravity, all the coils participate in levitating the proof masses.

Figure 5:
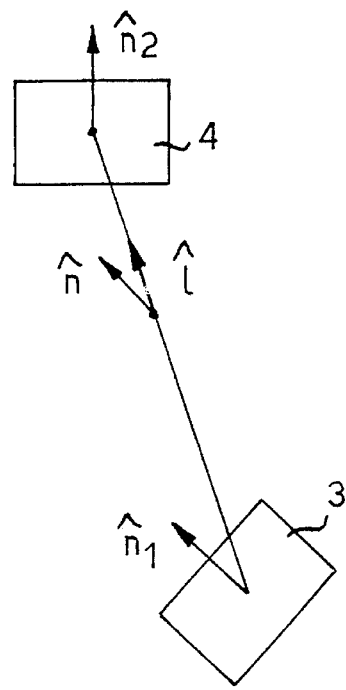
FIG. 5 illustrates general alignment errors in the gradiometer shown in FIG. 3.

The SGG proof masses 3,4 respond to the gravity components along their respective sensitive axes and a differential-mode sensing circuit (to be described later) measures the difference between the two resulting displacements. If $\vec{g}_1$ and $\vec{g}_2$ are the gravitational fields (accelerations) at the respective centres of mass of the proof masses 3,4 and $\hat{n}_1$ and $\hat{n}_2$ are the unit vectors along the respective axes (see FIG. 5), the SGG output in the absence of platform motions is $$\Gamma_{xx} = \vec{g}_2 \cdot \hat{n}_2 - \vec{g}_1 \cdot \hat{n}_1 \qquad (1)$$

In an ideal gradiometer, with $\hat{l}$ representing a baseline unit vector, $\hat{n}_1$, $\hat{n}_2$ and $\hat{l}$ are all identical. There are two basic alignment errors which can be represented in several equivalent ways. We write:

$$\hat{n} = \tfrac{1}{2}(\hat{n}_1 + \hat{n}_2) \qquad (2)$$

as the average orientation of the gradiometer sensitive axes. The axes parallelism error is $\delta\hat{n}$ and the axes collinearity error is given by $\delta\hat{l}$, where $$\delta\hat{n} \equiv \hat{n}_2 - \hat{n}_1 \qquad (3)$$

$$\delta\hat{l} \equiv \frac{\hat{n}_2 + \hat{n}_1}{2} - \hat{l}$$

These misalignments couple linear and angular accelerations of the platform $\vec{a}$ and $\vec{\alpha}$ to the gradiometer and lead to error terms in $\Gamma_{xx}$ ( equation (1)) given by $$\delta\Gamma_a = \frac{1}{l}\,\delta\hat{n}\cdot\vec{a} \qquad (4)$$

$$\delta\Gamma_\alpha = (\delta\hat{l}\times\hat{n})\cdot\vec{\alpha} \qquad (5)$$

respectively where l is the baseline of the gradiometer. In a practical application of the gradiometer, these errors can easily limit the gravity resolution of the instrument.

Figure 6:
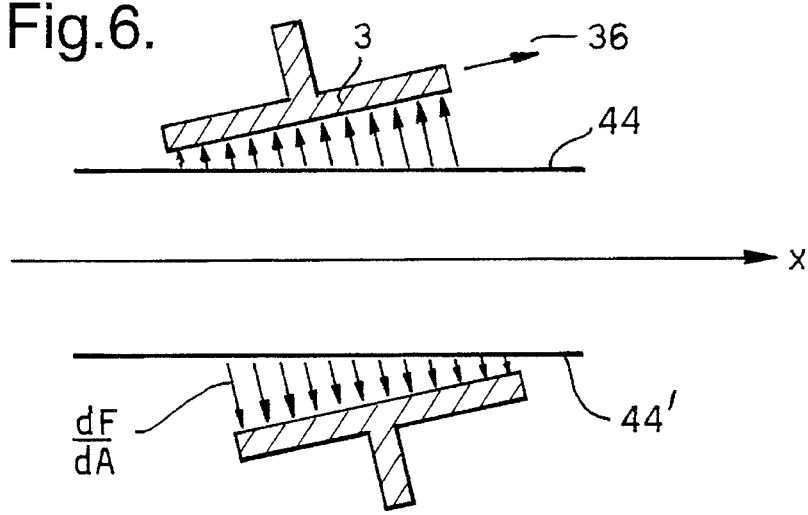
FIG. 6 is a section through the part of the gradiometer of FIG. 2 with alignment coils activated.

Consider one of each pair of z-axis alignment coils 44,44' and let the two coils be configured in such a way that the levitation force per unit area, dF/dA, varies along the x-axis in the opposite direction on the two opposing coils, as in FIG. 6. If, for example, dF/dA for the top alignment coil 44 increases with x and dF/dA for the bottom alignment coil 44' decreases with x, then the stationary position of the proof mass 3 will be tilted up. Further, if there is an acceleration or gravity signal in the x direction, the proof mass 3 will move along its tilted axis 36 because the proof mass will feel an increased upward differential force as it moves forward.

If we now provide a pair of alignment coils on both sides with levitation forces increasing along x in one pair and decreasing along x in the other pair, we should be able to adjust the alignment of the sensitive axis up or down by a desired amount by adjusting the persistent currents in the alignment coils. Levitation may be along either the z- or the y-axis (or both).

Figure 7:
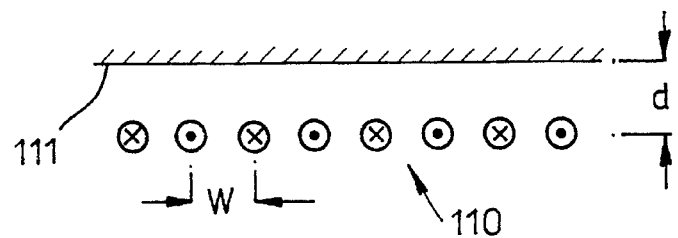
FIG. 7 illustrates the parameters affecting the coil windings for a gradiometer.
Figure 8:
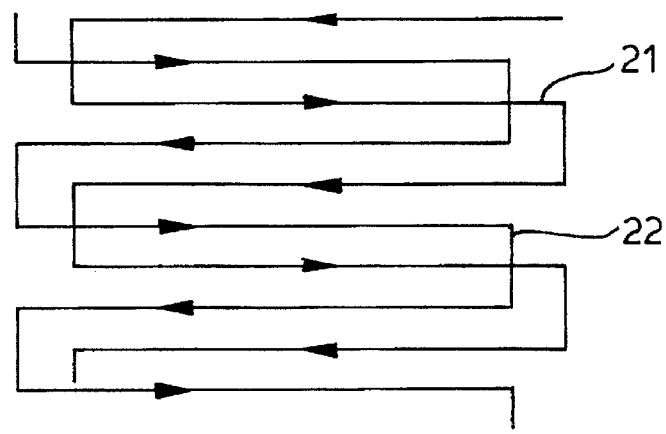
FIG. 8 is a plan view of a pair of interleaved windings for a proof mass support system according to the first aspect of the present invention.
Figure 9:
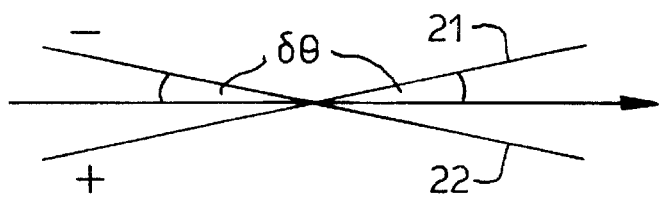
FIG. 9 is a section through the windings of Fig. 8.
Figure 10:
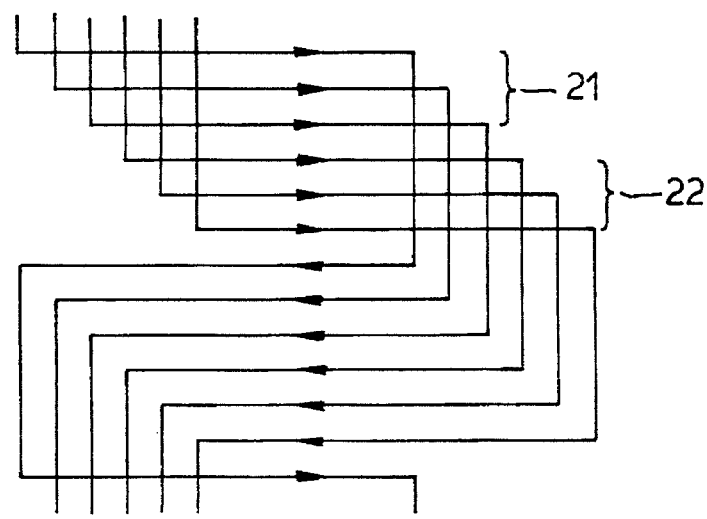
FIG. 10 is a plan view of an alternative arrangement for a pair of interleaved windings for a proof mass support system according to the first aspect of the present invention.
Figure 11:
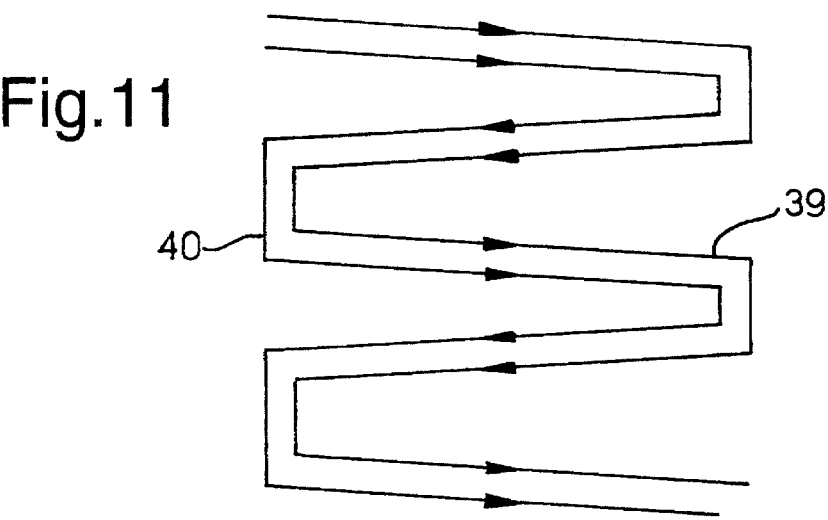
FIG. 11 is a plan view of a tapered winding arrangement for alignment coils of a proof mass support system according to the first aspect of the invention.
Figure 12:
FIG. 12 is a section through the tapered arrangement of FIG. 11.

A superconducting meander-pattern coil 110 (shown in FIG. 7) of pitch w (center to center distance between neighbouring turns of wire) at a distance d from the surface 111 of the superconducting proof mass, carrying a current I, exerts a force per unit area on the proof mass:

$$\frac{dF}{dA} \cong \mu_0 \frac{I^2}{w^2} [e^{2\pi d/w} - e^{-2\pi d/w}]^{-1} \quad (6)$$

where $\mu_0$ is the permeability of the vacuum. So dF/dA can be varied either by varying the coil gap d or pitch w, or both, along the sensitive axis. For effective levitation, d should be approximately equal to w.

Three specific examples of ways to configure the alignment coils are described below although the invention is not limited to these. The first, (shown in FIGS. 8 and 9), is to have two mutually interleaved meander-pattern coils, with one 21 slanted up by a small angle $\delta\theta$ and the other 22 slanted down by the same angle $\delta\theta$. This corresponds to the configuration shown in FIGS. 3 and 4 (except only one wire per turn is shown). If all the current flows in the slanted-up coil 21 and none in the slanted-down coil 22, the proof mass 3 will be aligned parallel to the slanted-up coil, with an angle $\delta\theta$ with the x axis. Likewise, if all the current flows in the slanted-down coil 22 and none in the slanted-up coil 21, the proof mass will be aligned parallel to the slanted-down coil, with an angle $-\delta\theta$ with the x axis. For an intermediate current distribution, the sensitive axis will lie between these two extreme angles.

The coils can be wound in many different ways and it is possible to change the distance between current reversals by having each coil, slanted up and slanted down, as several wires in parallel. This is illustrated by the coils 21,22 in FIG. 10 and also in FIG. 4. In each groove any number of wires can be placed in parallel. This has the effect of enabling levitation to greater separations, reducing spring constants and giving a larger dynamic range.

A third configuration (shown in FIGS. 11 and 12) is to have one meander-pattern coil with an increasing taper 39 interleaved with another with a decreasing taper 40. If all the current is now stored in the tapered-up coil 39 and none in the tapered-down coil 40, the proof mass will be tilted up on the right since the turns become more evenly spaced as x increases, thereby resulting in an effectively larger pitch (w) on the right than on the left. Likewise, if all the current flows in the tapered-down coil 40 and none in the tapered-up coil 39, the proof mass will be tilted-down on the right. For an intermediate current distribution, the sensitive axis will lie between these two extreme angles.

In practice, the proof mass will generally be supported by energizing the two coils with equal currents. Then final adjustment to make the proof mass horizontal is made by sending a differential current through the two coils. By controlling the current in each coil a resultant is produced such that the proof mass has its optimum alignment.

Quite independently, the second proof mass 4 can be aligned in a similar way so that it is collinear with the first proof mass 3 which is an important requirement for accurate measurement.

Figure 13:
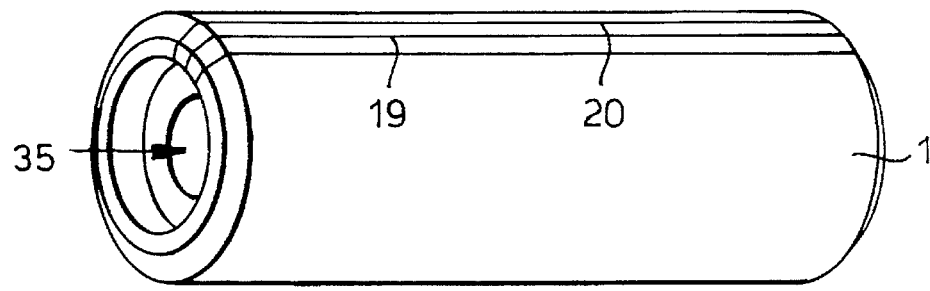
FIG. 13 shows an example of a former for a proof mass support system according to the first and/or second aspects of the invention.
Figure 14:
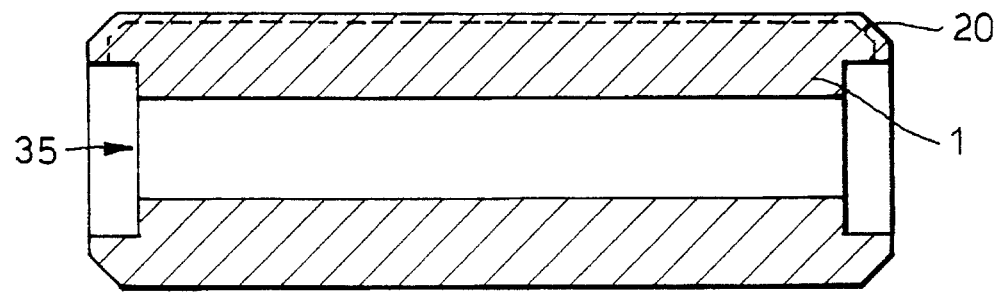
FIG. 14 is a section through the former of FIG. 13.

FIGS. 13 and 14 show an example of the coil former 1 for use in the present invention. A number of grooves 19,20 are cut into the surface of the former longitudinally to receive coil windings, which may be cut by a wire electron discharge machining (EDM) in the case of a metal coil former.

The former 1 is typically made of sapphire or any suitable insulating material and has a hollow central portion 35. The wires are insulated Niobium wires which are positioned in place in the grooves 19,20 on the sapphire former 1 together with a suitable adhesive and bonded in place.

Alternatively the former may be copper, and the wires may be copper clad Niobium or Niobium/Titanium which is directly bonded to the copper former 1.

A problem which may be encountered with Niobium-Titanium (NbTi) wire is flux creep. To reduce this, multifilament NbTi copper clad wire can be used instead, for example 60 filament NbTi wire of 0.1 mm diameter.

The purpose of bonding the wire to a copper former is to achieve passive damping of all but the sensitive axis resonance. Alternatively, and more easily, these resonances can be damped passively using resistors external to the relevant coils, which then can be mounted on an insulating former.

Figure 15:
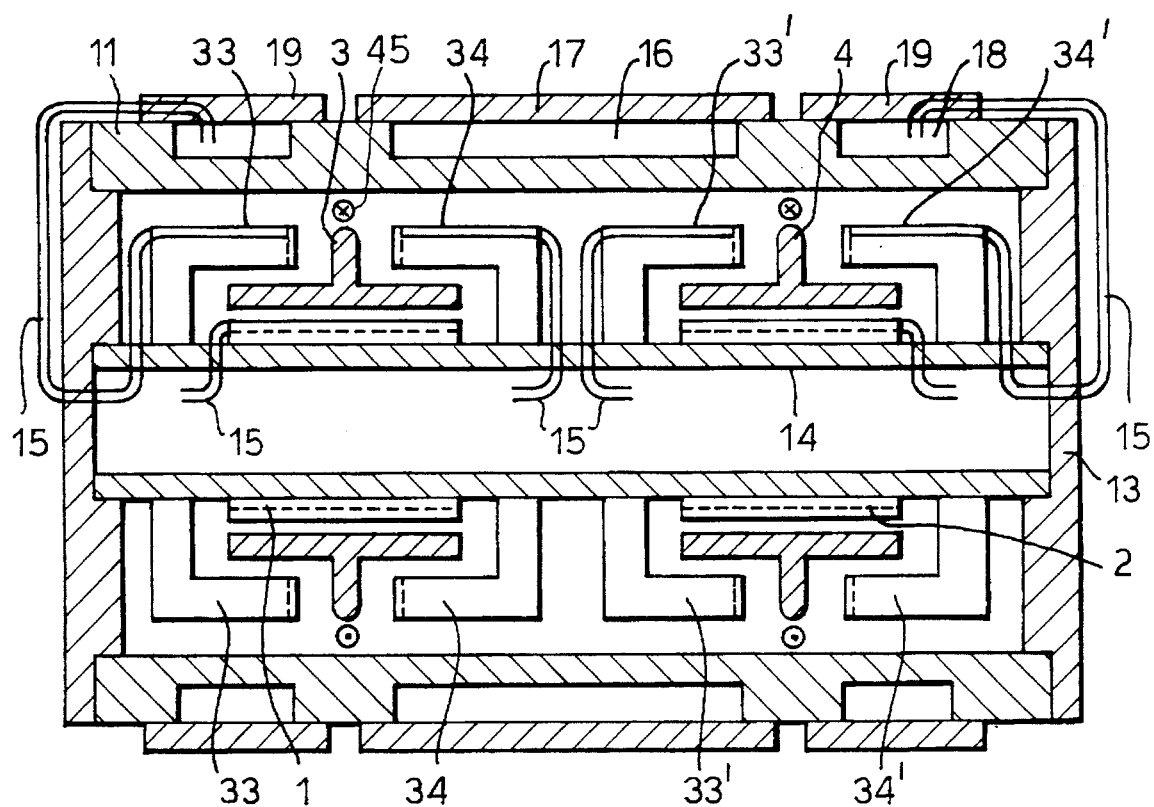
FIG. 15 is a section through a gradiometer incorporating a proof mass support system according to the first and/or second aspects of the present invention including its housing.

FIG. 15 shows a section through a housing of a SGG which incorporates the two sets of accelerometers previously described. The housing and a solid support such as a vehicle (not shown) form a platform whose motions can affect the results obtained from the SGG. The housing is cooled in a liquid helium bath in use. The inner formers 1,2 and outer formers (33,34) and (33',34') are mounted on a Niobium (Nb) inner tube 14 and shielded with a Nb outer housing 11. The housing is generally cylindrical surrounding the accelerometers and provided with a cavity 16 forming a housing for a SQUID and a cavity 18 for a junction box for electrical wiring 15. Nb covers 17,19 are provided over the cavities. The superconducting housing surrounding the accelerometers ensures that they are not subjected to undue external influences due to electrical and magnetic interference. The housing shields at all frequencies, but is transparent to gravity. Additional external screening is provided by a cryostat (not shown). The levitation coil formers 1,2 can be either metallic such as copper or aluminium or an insulator such as macor, quartz or sapphire. The sensing coils are mounted on macor, fused quartz or sapphire coil formers 33,34,33'34'.

Alternative wiring strategies are also possible, particularly one in which, referring to FIG. 15, the wiring 15 does not go outside the outer covers 11,19 and the cavities 18 are located entirely within a fully screened enclosure.

There are many ways different amounts of currents can be stored in various alignment coils. One example is given in FIG. 16. All four z-axis alignment coils 122', 122,121,121' ($L_{z11+}$, $L_{z12+}$, $L_{z12-}$, $L_{z11-}$ respectively), for proof mass 3 are connected together to form a loop in which a persistent current $I_{z1}$ is stored. Likewise, all four z-axis alignment coils 123', 123,124,124' ($L_{z21+}$, $L_{z22+}$, $L_{z22-}$, $L_{z21-}$ respectively), for proof mass 4 are connected together to form a loop in which a persistent current $I_{z2}$ is stored.

These two superconducting loops are connected in parallel to an inductor $L_{z3}$ and a shunt resistor $R_{z3}$ such that the coils with the same slant (or taper) always stay on the same branches of the loops. Another superconducting loop containing an inductor $L_{z4}$ and a shunt resistor $R_{z4}$ is coupled through transformers to the two loops sharing $L_{z3}$.

The persistent currents $I_{z1}$–$I_{z4}$ are stored or changed by injecting currents from current sources via leads connected to the superconducting loops, with heat switch resistors 124,125,126,127 activated with currents.

The currents $I_{z1}$ and $I_{z2}$ levitate proof masses 3 and 4 and apply stiffness to the z and $\theta_y$ (rotation about y axis) degrees of freedom. If now a persistent current $I_{z3}$ is stored through the inductor, this current is divided into four paths containing the alignment coils, weakening the currents through the slanted-up (or tapered-up) coils and strengthening the currents through the slanted down (or tapered-down) coils. Both proof masses will therefore be slanted down so by selecting the right sense and adjusting $I_{z3}$, one can reduce $\delta l$ to an arbitrarily small value and eliminate the sensitivity of the SGG to an angular acceleration about the y axis, $\alpha_y$.

If a persistent current $I_{z4}$ is stored in the loop containing $L_{z4}$, this will induce screening currents in the main loops such that the currents through the slanted-up (or tapered-up) coils increases and the current through the slanted-down (or tapered down) coils decreases in proof mass 3, slanting-up the proof mass. The current $I_{z4}$ induces an opposite effect on the currents in proof mass 4, slanting down the proof mass. Therefore, by choosing the right sense and adjusting $I_{z4}$ via input from a second current source by using a heat switch 127, one should be able to reduce $\delta\hat{n}$ to an arbitrarily small value and eliminate the SGG sensitivity to a linear acceleration along the z axis, $a_z$.

The shunt resistors $R_{z3}$ and $R_{z4}$ are to effect passive damping of the angular ($\alpha_y$) and linear ($a_z$) resonant accelerations of the proof masses.

Figure 16:
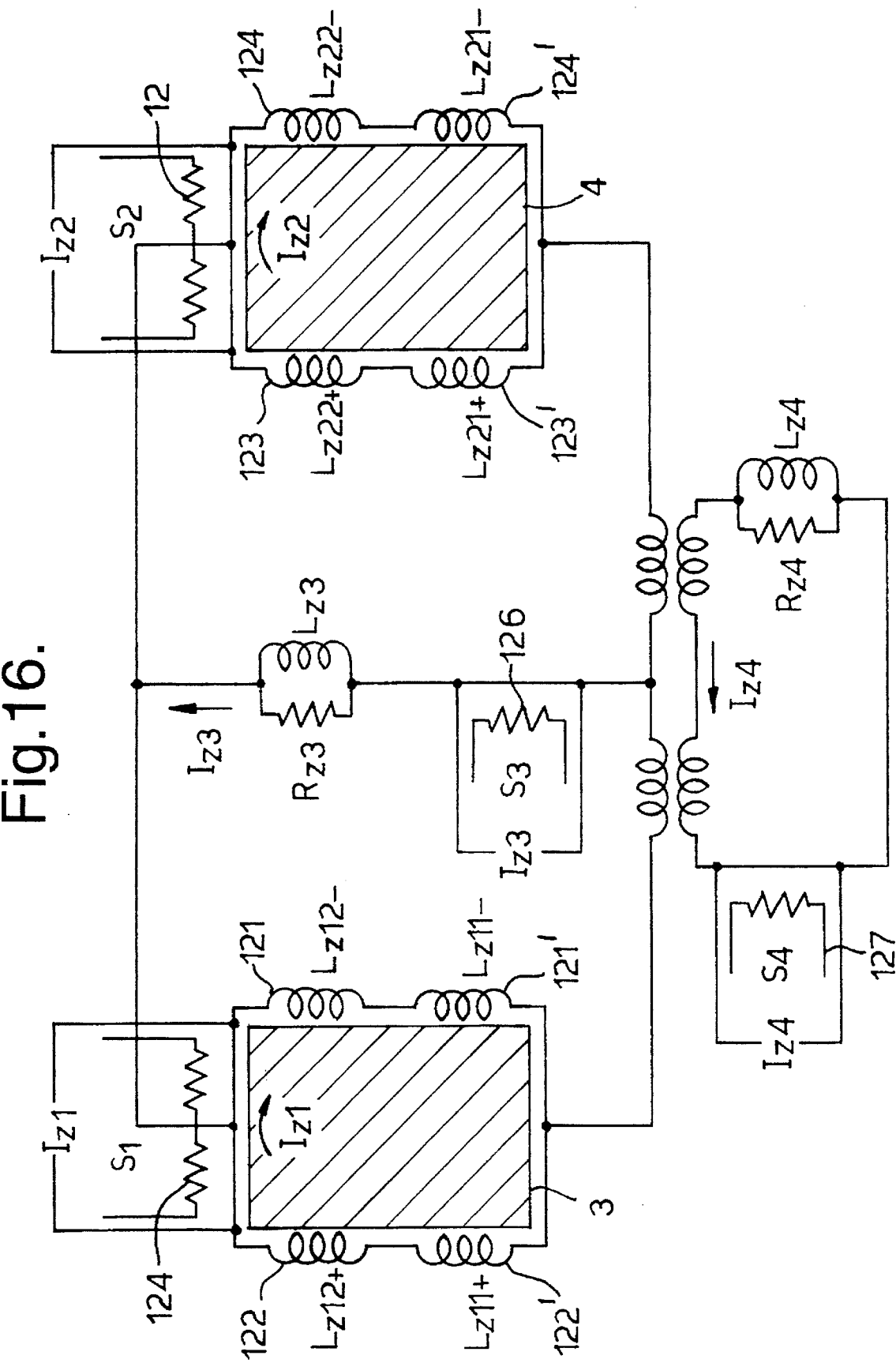
FIG. 16 is a circuit diagram for the z-axis alignment coils.

A circuit similar to the one shown in FIG. 16 is also provided for the y-axis alignment coils.

Unlike conventional sensing circuits, the differential-mode and common-mode sensing circuits for x-axis sensing coils are separated. This allows the improvement that not only is the common-mode acceleration balanced out in the differential-mode circuit, but also the differential-mode acceleration is balanced in the common-mode circuit, thus substantially decoupling the two sensing circuits from each other. This then permits passive damping to be used for the common mode, while active damping, which is required for the differential mode in order to avoid increasing the thermal Brownian motion noise, is used for the differential mode.

Figure 17:
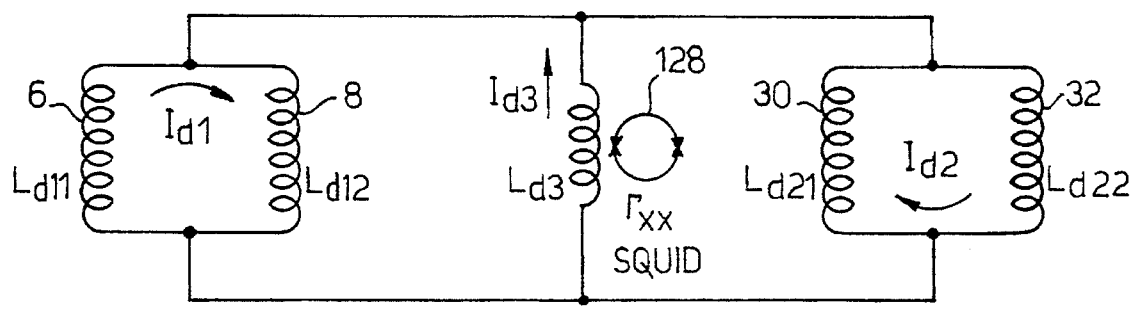
FIGS. 17 and 18 are circuit diagrams for x-axis sensing coils.

The differential-mode sensing circuit is given in FIG. 17. Currents, $I_{d1}$, $I_{d2}$ tune the differential-mode resonance frequency. The ratio $I_{d2}/I_{d1}$ is adjusted to balance out the common mode in the differential-mode ($\Gamma_{xx}$) SQUID 128 output. $I_{d3}$ is used to achieve a wideband common-mode balance.

Figure 18:
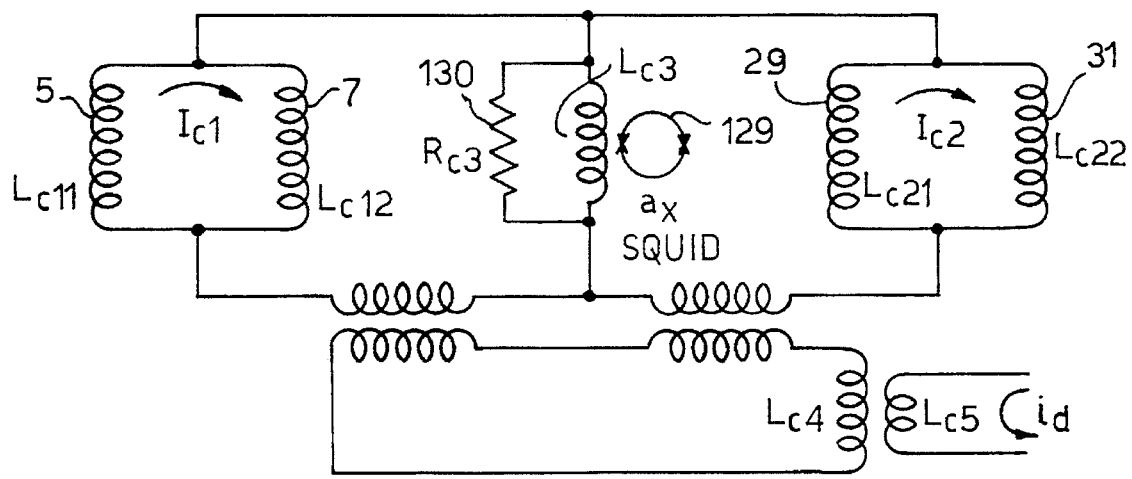

The common-mode sensing circuit is given in FIG. 18. Currents, $I_{c1}$, $I_{c2}$ tune the common-mode resonance frequency. The ratio $I_{c2}/I_{c1}$ is adjusted to balance out the differential mode in the common-mode ($a_x$) SQUID 129 output. $R_{c3}$ (130) is a shunt resistor for passive damping of the common mode. Because the differential mode has been balanced out from the $L_{c3}$ path that couples to the SQUID, $R_{c3}$ does not damp the differential mode.

Active damping of the differential mode is achieved by the following means. The differential-mode SQUID 128 output $\Gamma_{xx}$ is narrowbanded around its resonance and phase-shifted by 90° to produce a damping term. This voltage signal is converted into a current signal $i_d$ and is fed back to the inductor $L_{c5}$ of the common-mode sensing circuit. This current damps the differential-mode resonance. If desired, a force-rebalance feedback could also be applied through $L_{c5}$.

In order to have a high gradient sensitivity, the differential-mode frequency must be kept low. On the other hand, the common-mode frequency must be as high as possible to reduce the common-mode response of the proof masses to platform vibrations as well as to unbalanced differential-mode feedback currents. We accomplish this by making $L_{c3}$ small and $L_{c4}$ large compared to sensing coil inductances in the common-mode circuit:

$$L_{c3} < L_{c11} \approx L_{c12} \approx L_{c21} \approx L_{c22} < L_{c4} \qquad (7)$$

so that the common and differential modes see an almost short-circuited or almost open-circuited output inductance, respectively, and by keeping the differential-mode sensing currents low and the common-mode sensing currents high:

$$I_{d1} \approx I_{d2} < I_{c1} \approx I_{c2} \qquad (8)$$

By providing separate circuits for differential mode and common mode, the differential mode can be balanced in the common mode circuit and the sensitivities of each circuit adjusted independently. Balancing of the differential mode in the common mode circuit is not possible in a conventional arrangement where the differential mode and common mode are measured from the same set of coils.

The differential-mode and common-mode frequencies can be separated further by applying an additional superconducting negative spring along the sensitive axis.

Figure 19:
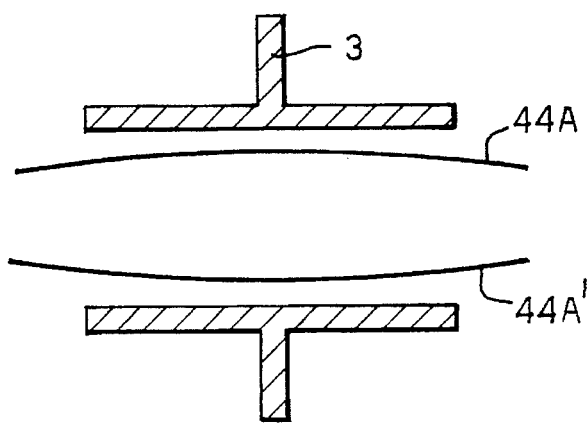
FIG. 19 is a longitudinal section through a proof mass using curved levitation coils which form a negative spring.

One way of providing a negative spring is by use of curved levitation coils, as shown in FIG. 19. The concave levitation coils 44A, 44A' (similar to 44 and 44') produce an unstable equilibrium for the x position of the proof mass 3, effectively creating a negative spring in the x direction.

Figure 20:
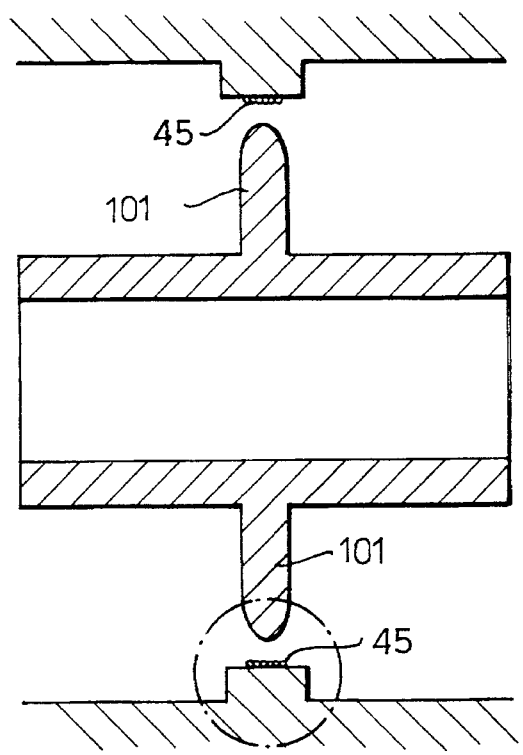
FIG. 20 is a longitudinal section through another proof mass using a ring shaped coil which forms a negative spring.
Figure 20A:
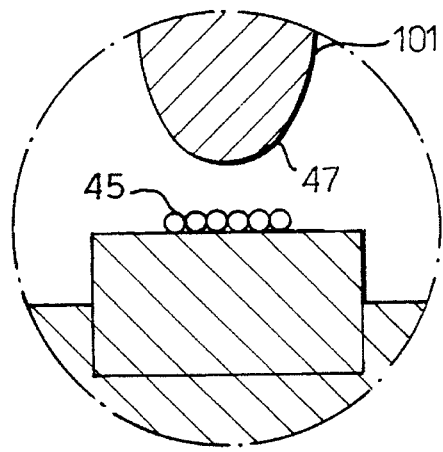
FIG. 20A is an enlarged view of part of FIG. 20.

An alternative configuration is by locating a ring-shaped superconducting coil 45 outside the center ring 101 of the proof mass 3 whose surface is rounded in this case, as shown in FIG. 20 and at 47 in the enlarged view in FIG. 20a. A persistent current stored in coil 45 produces an unstable equilibrium for the x position of the proof mass 3, providing the desired negative spring. The negative spring can reduce the differential-mode frequency to near zero while maintaining a relatively high frequency for the common mode, thereby improving the sensitivity and common-mode rejection of the SGG.

Figure 21:
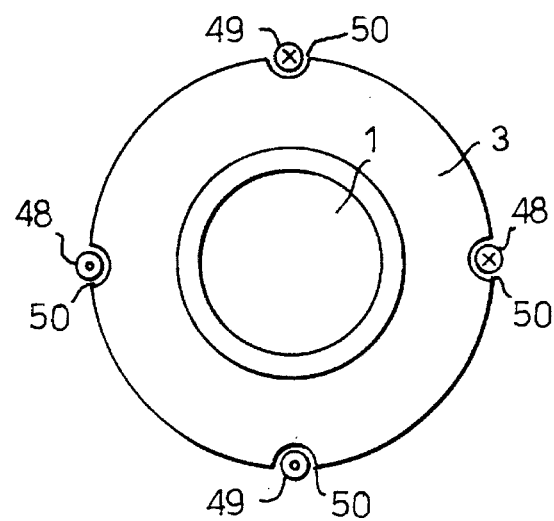
FIG. 21 is a cross-section through a first proof mass support system according to the second aspect of the present invention.
Figure 22:
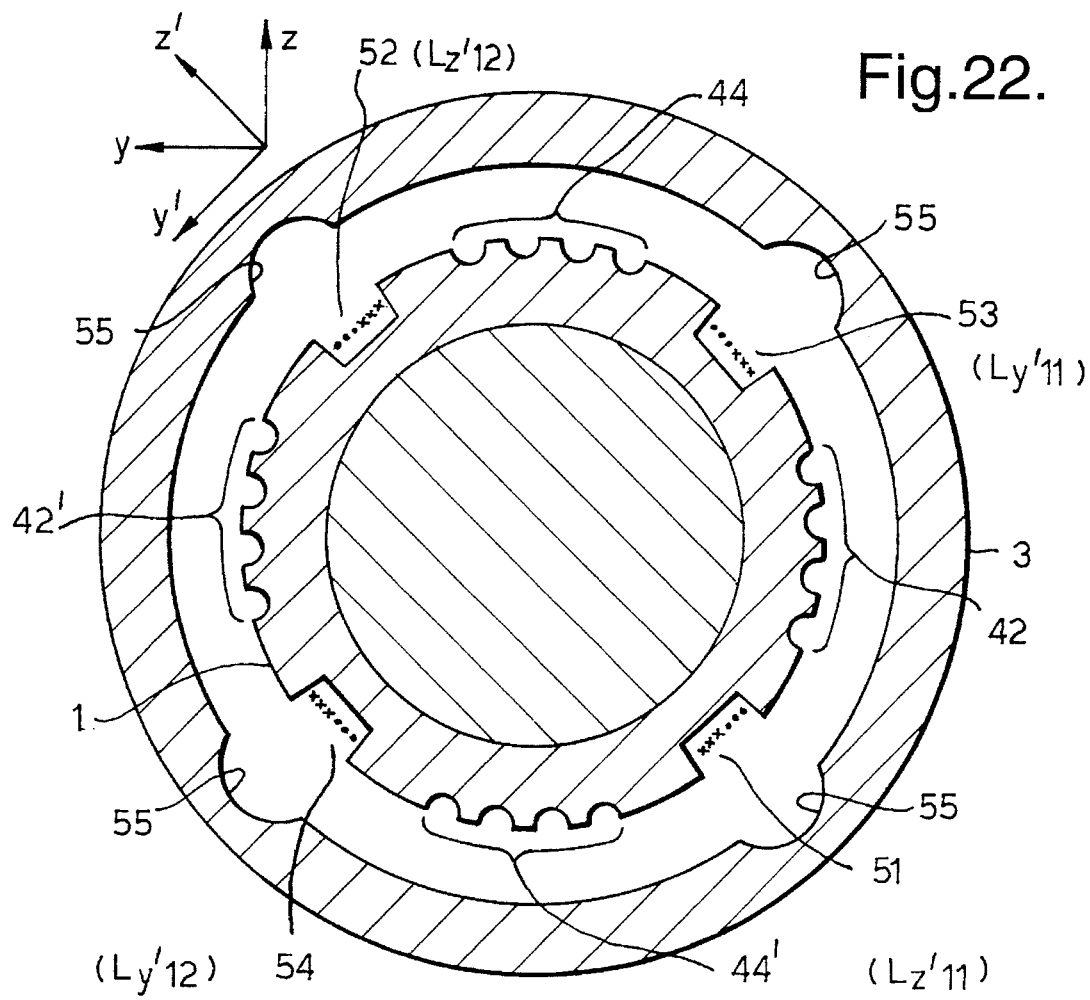
FIG. 22 is a cross-section through an alternative arrangement for rotation prevention according to the second aspect of the present invention.

FIGS. 21 and 22 illustrate first and second embodiments of a proof mass support system according to the second aspect of the invention.

Rotation of the proof mass about the x axis ($\theta_x$) can convert surface irregularities of the proof mass into noise in the gradiometer. The $\theta_x$ rotation can be stopped by providing two single-turn anti-rotation coils 48,49 equispaced about the inner circumference of the outer former (not shown), as shown in FIG. 21. Four matching grooves 50 are provided in the proof mass 3. A persistent current stored in the two loops will provide a restoring force to the proof mass in the $\theta_x$ direction, thus preventing an uncontrolled rotation of the proof mass.

An alternative method of rotation prevention is shown in FIG. 22 where, instead of the grooves 50 shown in FIG. 21, cutouts, e.g. in the form of circular grooves 55, are made along the entire inner length of the proof mass 3. Pancake anti-rotation coils 51,52,53,54 ($L_{z'11}$, $L_{z'12}$, $L_{y'11}$, $L_{y'12}$) are wound on the levitation coil former 1. The y' and z' axes are axes rotated by 45° from the y and z axes. The proof mass is then at a minimum energy position when the cutouts 55 are opposite the coils 51–54. These anti-rotation coils have another useful function in stiffening z and y axis motions. If the upper coils 52 and 53 are used, they will provide additional levitation with respect to gravity (in the negative z direction) and will help bring the coil former and proof mass closer to concentricity. In a zero-g environment, the anti-rotation coils can become the major stiffening elements for y and z motions if the currents through the meander-pattern alignment coils 42,42', 44, 44' are kept small. Small currents through the meander-pattern coils ultimately lead to a very low resonance frequency for the sensitive axis.

When the proof masses float symmetrically about the coil former, the meander-pattern coils no longer provide any levitation. Coil $L_{z12\_}$ provides levitation which is exactly cancelled by Coil $L_{z11\_}$. However, they still provide stiffness and alignment control which is now their main function.

In zero g all the anti-rotation coils will be energised for the purpose of preventing rotation. In the Earth's gravity, only the upper coils 52 and 54 need to carry persistent currents.

Figure 23:
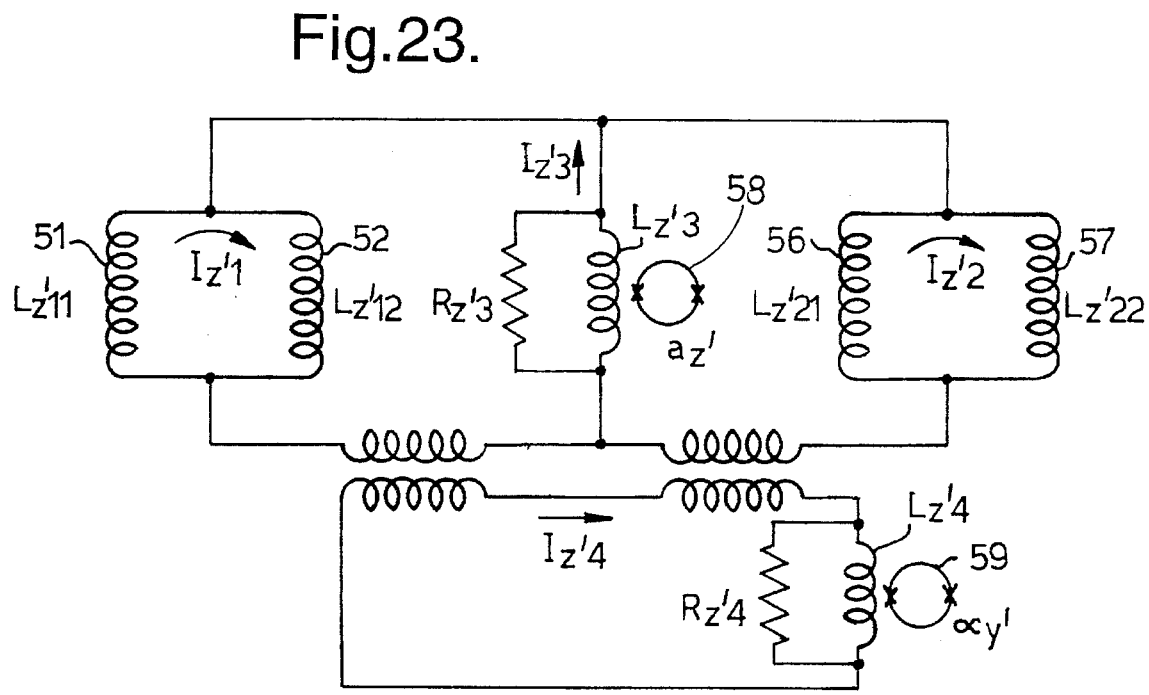
FIG. 23 is a circuit diagram for the z'-axis anti-rotation coils according to the third aspect of the present invention.

The anti-rotation coils may be used to sense the radial linear and angular accelerations. FIG. 23 shows a sensing circuit that connects the anti-rotation coils $L_{z'11}$ and $L_{z'12}$ (51,52) of proof mass 3 and the corresponding coils $L_{z'21}$ and $L_{z'22}$ (56,57) associated with proof mass 4 to sensing SQUIDs 58 and 59. With currents $I_{z'1}$ and $I_{z'2}$ stored in the sense shown, SQUIDs 58,59 measure the linear acceleration along the z' axis ($a_{z'}$) and the angular acceleration about the y' axis ($\alpha_{y'}$) respectively, where y' and z' are the axes rotated by 45° from the y and z axes. A similar circuit can be provided for the anti-rotation coils $L_{y'11}, L_{y'12}, L_{y'21}$ and $L_{y'22}$ to sense the linear acceleration along the y' axis ($a_{y'}$) and the angular accelerations about the z' axis ($\alpha_{z'}$).

The acceleration components in the y z-coordinates can be obtained from the acceleration components measured in the y'z'-coordinates by $$\alpha_y = \frac{1}{\sqrt{2}} (\alpha_{y'} - \alpha_{z'}), \alpha_z = \frac{1}{\sqrt{2}} (\alpha_{y'} + \alpha_{z'}), \quad (9)$$

$$\alpha_y = \frac{1}{\sqrt{2}} (\alpha_{y'} - \alpha_{z'}), \alpha_z = \frac{1}{\sqrt{2}} (\alpha_{y'} + \alpha_{z'}) \quad (10)$$

The angular acceleration outputs $\alpha_y$ and $\alpha_z$ will be integrated to obtain the angular velocities $\Omega_y$ and $\Omega_z$ of the platform, which will then be used to make the necessary corrections for centrifugal acceleration.

The shunt resistors $R_{z'3}$ and $R_{z'4}$ provide passive damping for the radial translational ($a_{z'}$) and rotational ($\alpha_{y'}$) modes.

The output inductances $L_{z'3}, L_{z'4}$ are kept small in comparison with the pancake coil (51,52,56,57) inductances to obtain maximum stiffness for both radial translational and rotational degrees of freedom and to prevent overloading the SQUIDs 58 and 59. This may be achieved by adding a small shunt inductance across the SQUID input coils.

The anti-rotation coils 51,52,56,57 should not protrude beyond the ends of the proof mass since this would produce a large stray inductance. Therefore the anti-rotation coils are made slightly shorter than the length of the proof mass. This geometry also has the effect of producing a negative spring.

Since the gradiometer is completely superconducting, it must be stored in a cryostat to cool it to the necessary temperature for operation. For airborne applications, it is desirable to keep down the size of the dewar, for example, to four foot high by two foot outside diameter. Liquid helium is stored within a mu-metal or cryoperm shield inside a vacuum jacket. The vacuum jacket could be formed from Niobium with penetration welds. If three-dimensional measurements are to be made, the gradiometer requires three-point suspension.

A levitated proof mass gradiometer has a number of advantages. By using a low resonance frequency, high sensitivity can be achieved. For a signal bandwidth between $10^{-3}$ and $10^{-1}$ Hz, $\omega_d/2\pi$ can be maintained at approximately 0.2 Hz, where $\omega_d$ is the resonance frequency of the differential mode. The displacement at a given frequency is $$x(\omega) = a(\omega)/(\omega^2 - \omega_d^2). \quad (11)$$

The value of $\omega_d/2\pi$ achieved is a substantial improvement over a gradiometer with a mechanical spring for which $\omega_d/2\pi$ is in the range 5–10 Hz, thus a proof mass of 0.1 kg may be sufficient in the present invention to obtain a gradient sensitivity of $10^{-3}$ E $Hz^{-0.5}$ where $1 E = 10^{-9} s^{-2}$.

A further feature is that the improved alignment results in better common-mode rejection. With a particular arrangement of alignment coils, complete alignment is obtained against both linear and angular accelerations. While mechanically suspended proof masses have $|\delta\hat{n}|$ and $|\delta\hat{l}|$ between $10^{-3}$ and $10^{-4}$, in the present invention $|\delta\hat{n}|$ and $|\delta\hat{l}|$ can be reduced to below $10^{-6}$ by adjusting persistent currents $I_{y3}, I_{y4}, I_{z3}, I_{z4}$, in the alignment circuits.

A number of alternative arrangements to the single axis gravity gradiometer discussed above will now be described with reference to FIGS. 24–27. Each of these configurations may incorporate proof mass support systems according to the first and second aspects of the invention and/or sensing systems according to the third aspect of the present invention.

Three-Axis Gravity Gradiometer

In most circumstances several gradiometers will be used in parallel to measure different components of the gravity gradient tensor. A particularly useful one is a three axis inline component gradiometer measuring $\Gamma_{xx}, \Gamma_{yy}$ and $\Gamma_{zz}$. One of the major advantages of this configuration is related to the fact that, in free space, $$\Gamma_{xx} + \Gamma_{yy} + \Gamma_{zz} = 0 \quad (12)$$

The sum of the diagonal elements being zero is an extremely useful self checking feature for such an instrument which enables the most sensitive measurement to be made. It is clear that the single-axis gradiometer described above can be used in a three-axis configuration thereby giving all the benefits that such a configuration confers.

The design looks schematically as shown in FIG. 24. Three inline gravity gradiometers comprising pairs of inline proof masses 230,231,232 are arranged with their sensitive axes in three orthogonal directions (x,y,z). In the Earth's field, the "umbrella" configuration is often used whereby all axes make the same angle to the direction of gravity. Each component is then approximately the same, and, as their sum is zero, each will be measuring small signals only.

The SQUID sensing and levitation circuits, alignment coils and negative springs are all applied in virtually the same way as for the single axis gradiometer described above.

Two Component Accelerometer

Figure 25:
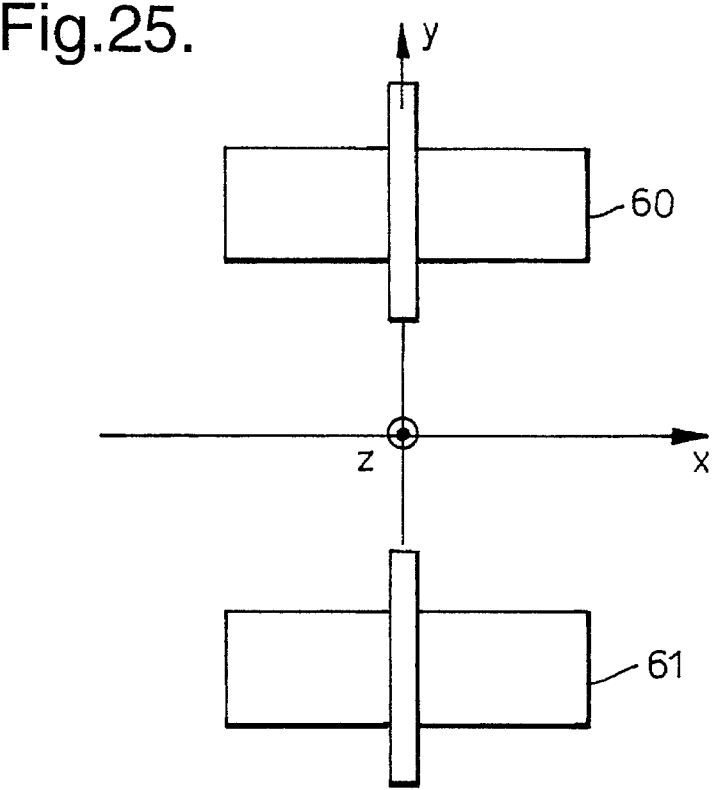
FIG. 25 illustrates the configuration of a two-component accelerometer.

A further embodiment of the invention is shown in FIG. 25 which is a schematic diagram of a two-component accelerometer comprising a first accelerometer with a proof mass 60, and a second accelerometer with a proof mass 61. Each accelerometer is sensitive to acceleration/gravity in the x direction.

By coupling the SQUID detection circuits in a similar way as shown previously for the single axis gradiometer it is possible to measure the difference in accelerations between the two proof masses across a baseline perpendicular to the sensitive axis. This device measures an angular acceleration in the absence of cross-component gravity gradients.

Using another SQUID circuit it is also clearly possible to measure the linear acceleration $a_x$. Thus this instrument can be configured to measure $a_x$ and $\alpha_z$ (i.e. is a two-component accelerometer). As with the gravity gradiometer previously described, the arrangement in FIG. 25 can also be used to measure all other acceleration components, albeit with reduced sensitivity.

Cross-Component Gravity Gradiometer

Figure 26:
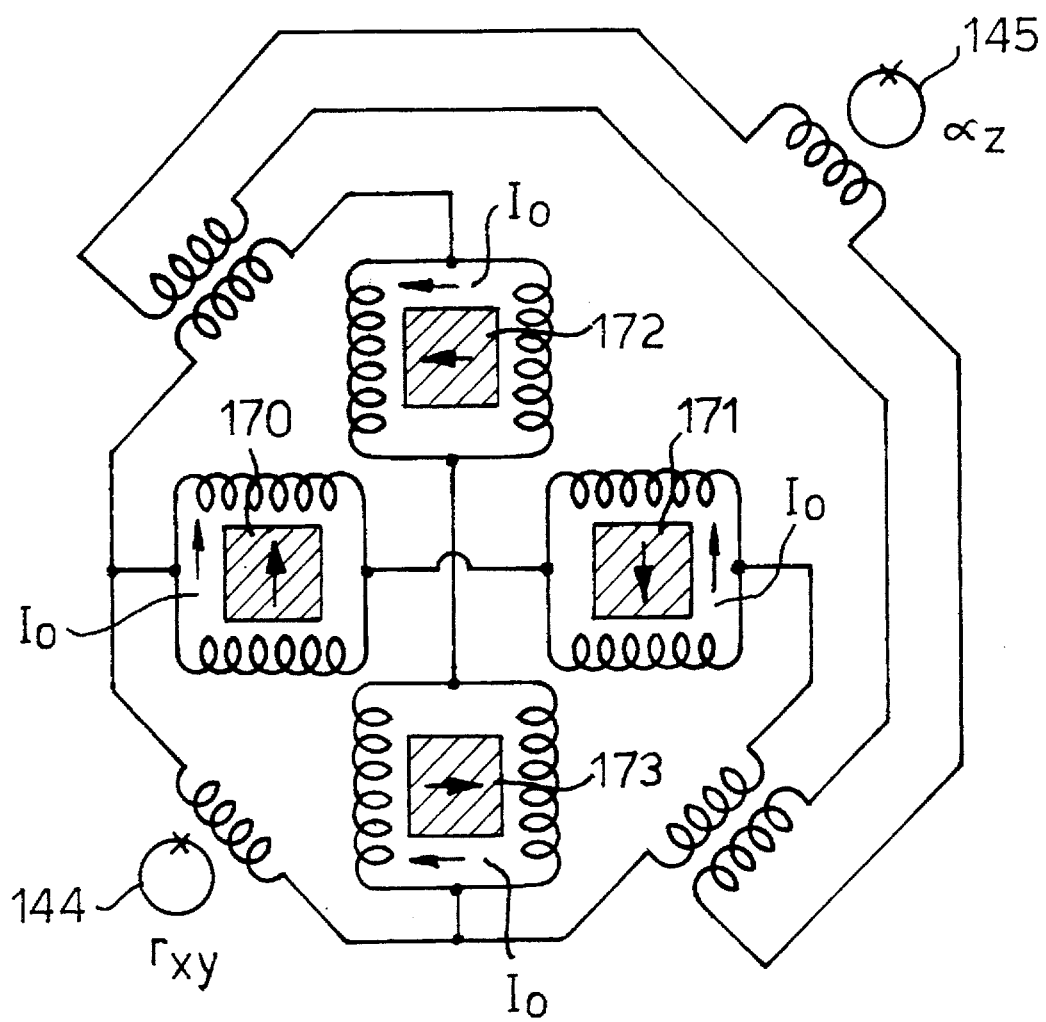
FIG. 26 illustrates the sensing circuit and proof mass configuration of a cross-component gravity gradiometer.

By combining two such two-component accelerometers with their sensitive axes orthogonal to one another as shown in FIG. 26, a cross-component gravity gradiometer can be formed. The gradiometer comprises a first two-component accelerometer comprising a pair of proof masses 170,171, and a second coplanar two-component accelerometer comprising a pair of proof masses 172,173. With persistent currents stored as shown in FIG. 26, SQUIDS 144,145 measure the cross-component gravity gradient $\Gamma_{xy}$ and the angular acceleration $\alpha_z$ respectively.

The sensitive axes can be aligned by using the same procedures as used for the gradiometer previously described.

Differential Accelerometer

An extension of the two-component accelerometer is one for which the proof masses have the same sensitive axes and identical centres of gravity. This forms a differential accelerometer (not shown in any Figure) and the alignment procedure is identical to that for the single-axis SGG.

By forming the two proof masses in the differential accelerometer of different materials, Einstein's Equivalence Principle can be tested.

Six-Axis Accelerometer

By utilising three of the two-component accelerometers it is possible to make an instrument which measures all six possible acceleration components, three linear and three angular.

Figure 27:
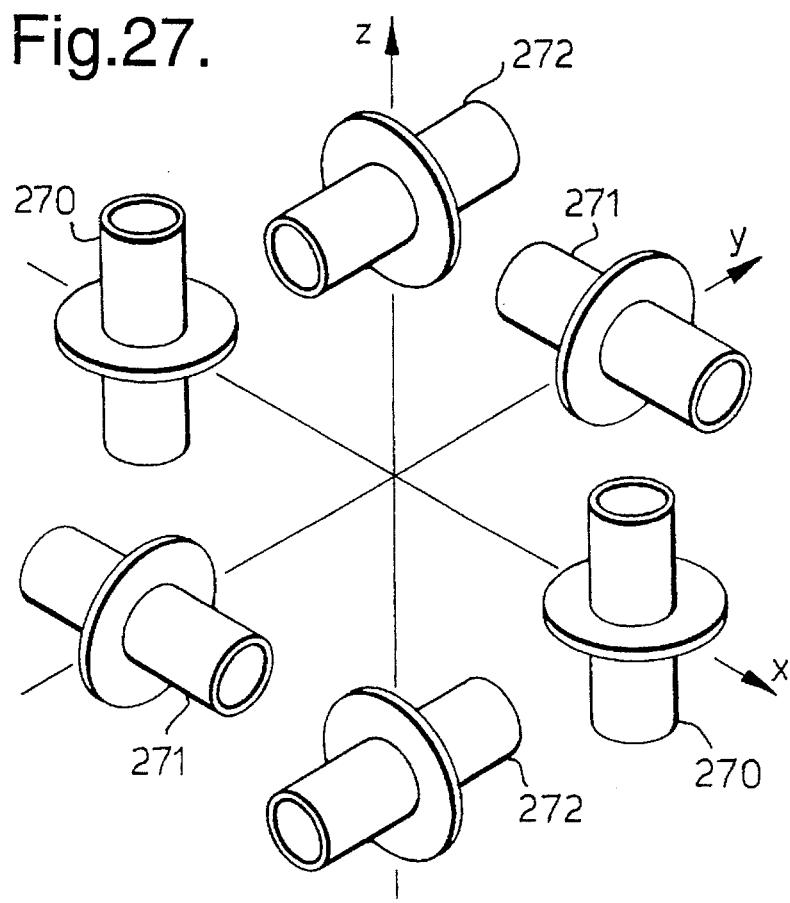
FIG. 27 illustrates the configuration of a six-axis accelerometer.

The arrangement would conceptually look similar to the six-axis accelerometer drawn in FIG. 27. This comprises three two component accelerometers 270,271,272 arranged orthogonally.

Tensor Gravity Gradiometer

By utilising the radial sensing circuit shown in FIG. 23 in the three-axis gradiometer of FIG. 24, or the six-axis accelerometer of FIG. 27, a tensor gravity gradiometer which measures all three inline and three cross-component gravity gradients can be constructed by ensuring matching of the scale factors of the measurement circuits.

Figure 28:
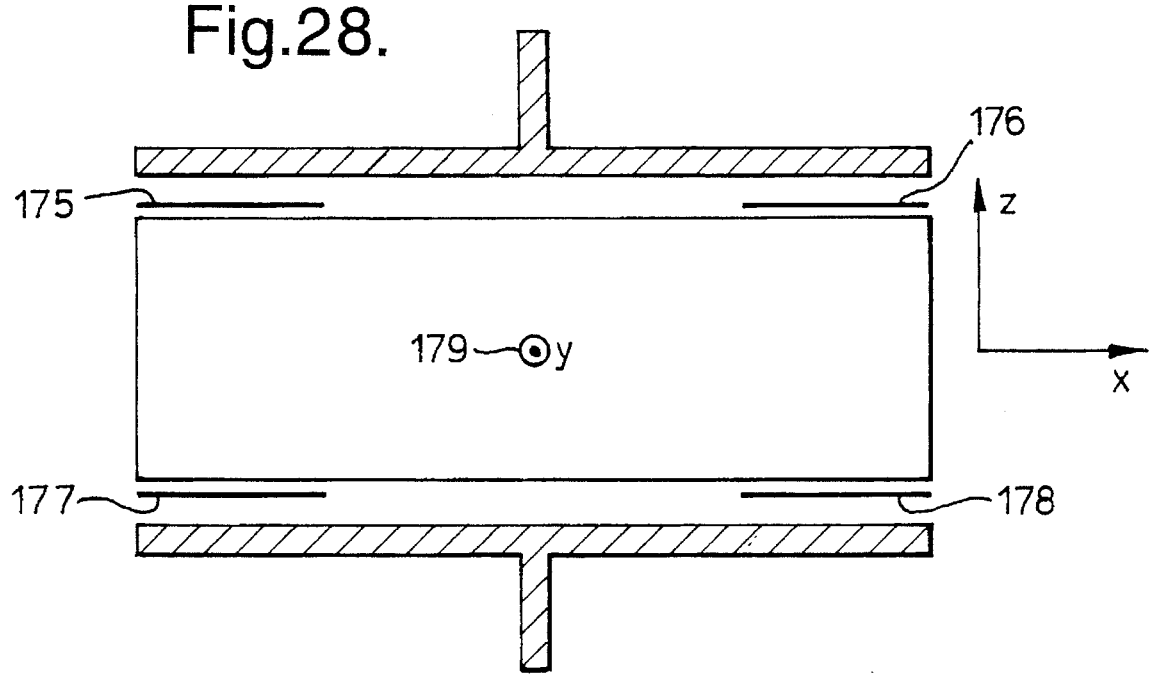
FIG. 28 is a cross-section through an alternative proof mass support system according to the first aspect of the present invention.

A further alternative embodiment of the y- and z-axis alignment coils is shown in FIG. 28, which is a cross-section showing the z-axis alignment coils of a single proof mass support system. In this case the upper z-axis alignment coils 175,176 and lower z-axis alignment coils 177,178 are conventional meander-pattern or pancake coils (i.e. they each provide a substantially constant levitation force in the x direction). However, since the coils 175–178 are displaced with respect to the center of mass of the proof mass 179, their levitation force provides a moment about the y axis. Therefore, by adjusting the relative levitation forces provided by adjacent coils 175,176 and 177,178 the sensitive axis of the proof mass can be aligned with the x axis. If, in the circuit shown in FIG. 16, we use coils 175,178 (shown in FIG. 28) instead of the coils 122,122' and coils 176,177 instead of 121,121' the alignment circuit will work identically. The y-axis alignment coils (not shown) are arranged in a similar way.

Note, by Einstein's Equivalence Principle, all the single proof mass accelerometers just described are also gravimeters, so clearly can be used for sensitive gravimetry.

The proof mass support systems described above all use levitation coils to levitate superconducting proof masses (due to the Meissner effect) and do not employ any mechanical springs. However, in an alternative embodiment, part of the levitation force on the proof mass/es may be provided by cantilever springs.

Typical applications for an accelerometer or gravity gradiometer incorporating a proof mass support system according to the first and second aspects of the invention are all areas where ultra sensitive gravimetry, gravity gradient and acceleration measurements are required.

A gravity gradiometer may be used to test that nuclear warheads have been decommissioned by comparing gravity gradient with that expected. Low noise reconstruction of the gravity field may be achieved by moving an instrument over the Earth's surface, for mineral, oil and gas exploration.

A gravimeter or gravity gradiometer may be used for detection of movement in the Earth's mantle and crust prior to earthquake or volcanic action.

We claim:

1. A proof mass support system comprising a pair of alignment coils for controlling the rest position of an elongate proof mass, wherein said alignment coils are constructed to provide a levitation force when they carry electric currents which varies along the length of said proof mass; and means for tuning the relative strength of said electric currents in said alignment coils to cause said proof mass to take up a predetermined orientation with respect to one or more degrees of freedom defined by said alignment coils.

2. A system according to claim 1 wherein said proof mass is formed of superconducting material, and said alignment coils are formed of superconducting material whereby said electric currents comprise persistent electric currents.

3. A system according to claim 1 wherein at least one of said degrees of freedom comprises rotation about an axis substantially orthogonal to the direction of said levitation force and to the length of said coils.

4. A system according to claim 3 wherein said alignment coils comprise meander-pattern coils.

5. A system according to claim 1 wherein the distance from one or both of said alignment coils to the surface of said proof mass varies along the length of said alignment coil/s.

6. A system according to claim 5 further comprising a former having grooves in which said alignment coils are wound, wherein the depth of said grooves increases along said former's length.

7. A system according to claim 1, wherein said alignment coils comprise interleaved sets of multiple wires.

8. A system according to claim 1 wherein the number of turns per unit length of one or both of the coils varies along the length of the coil/s.

9. A system according to claim 8, wherein said alignment coils comprise a pair of tapered, interleaved wires.

10. A system according to claim 1 wherein said proof mass is substantially cylindrical.

11. A system according to claim 1 further comprising additional alignment coils adapted to provide levitation forces in other directions whereby levitation of said proof mass against a gravitational field can be achieved in substantially all orientations of said proof mass with respect to said gravitational field.

12. A system according to claim 11, wherein at least two of said additional alignment coils comprise a second pair of elongate coils which extend in substantially the same direction as said first pair of alignment coils; and wherein said second pair of alignment coils are constructed to provide a levitation force when they carry electric currents which varies along the length of said second pair of coils; said system further comprising means for tuning the relative strength of said electric currents in said additional alignment coils to cause said proof mass to take up a predetermined orientation with respect to one or more degrees of freedom defined by said second pair of alignment coils.

13. A system according to claim 1, wherein said alignment coils comprise Niobium wire wound on an insulating former.

14. A system according to claim 1 wherein said proof mass comprises a main body section with a ring extending therefrom.

15. A system according to claim 14, wherein a surface of said ring remote from said main body section is curved and a coil is located radially outwardly of the surface of said ring such that a negative spring is formed.

16. A system according to claim 1 further comprising a set of concave alignment coils which levitate said proof mass and produce an unstable equilibrium in use such that a negative spring is formed.

17. A system according to claim 1, wherein said alignment coils extend along the length of said proof mass, and are constructed such that when they carry electric currents they provide a levitation force which varies along the length of said coils in a predetermined manner.

18. A system according to claim 1, wherein said pair of alignment coils are displaced with respect to the center of mass of said proof mass along the length of said proof mass.

19. An accelerometer comprising:
   an elongate proof mass having a sensitive axis and supported by a support system including a pair of alignment coils for controlling the rest position of the proof mass, wherein said alignment coils are constructed to provide a levitation force when they carry electric currents which varies along the length of said proof mass, and the relative strength of said electric currents in sniff alignment coils is tuned to cause said proof mass to take up a predetermined orientation with respect to one or more degrees of freedom defined by said alignment coils; and
   at least one sensing coil for monitoring movement of said proof mass due to acceleration of the proof mass with respect to the sensitive axis.

20. An accelerometer comprising:
   a first proof mass supported by a first support system including a pair of first alignment coils for controlling the rest position of the first proof mass, wherein said first alignment coils are constructed to provide a first levitation force when they carry electric current which varies along the length of said first proof mass and the relative strength of said electric currents is tuned in said first alignment coils to cause said first proof mass to take up a corresponding predetermined orientation; and
   a second proof mass supported by a second support system including a pair of second alignment coils for controlling the rest position of the second proof mass, wherein said second alignment coils are constructed to provide a second levitation force when they carry electric current which varies along the length of said second proof mass and the relative strength of said electric currents is tuned in said second alignment coils to cause said second proof mass to take up a corresponding predetermined orientation;
   wherein each proof mass has at least one associated sensing coil for monitoring movement of each proof mass with respect to a sensitive axis.

21. An accelerometer according to claim 20, wherein said alignment coils are arranged to orient said sensitive axis of each said proof mass, further comprising means to tune the relative strength of said currents in said alignment coils so as to align said sensitive axes of the proof masses with respect to each other in order to minimise alignment errors.

22. An accelerometer according to claim 20, further comprising a differential-mode sensing circuit and a common-mode sensing circuit connected to said sensing coils for sensing a change in the gravitational field strength wherein said common-mode sensing circuit is substantially decoupled from said differential-mode circuit.

23. A gravity gradiometer comprising:
   a first accelerometer including a first proof mass and a pair of first alignment coils for controlling the rest position of the first proof mass and wherein said first alignment coils provide a levitation force which varies along the length of said first proof mass and the relative strength of said electric currents is tuned in said first alignment coils to cause said first proof mass to take up a corresponding predetermined orientation; and
   a second accelerometer including a second proof mass and a pair of second alignment coils for controlling the rest position of the second proof mass, wherein said second alignment coils provide a levitation force which varies along the length of said second proof mass and the relative strength of said electric currents is tuned in said second alignment coils to cause said second proof mass to take up a corresponding predetermined orientation.

24. A gradiometer according to claim 23, further comprising a differential-mode sensing circuit and a common-mode sensing circuit connected to said sensing coils for sensing a change in the gravitational field strength wherein said common-mode sensing circuit is substantially decoupled from said differential-mode circuit.

25. A gravity gradiometer according to claim 23, wherein said alignment coils are arranged to orient said sensitive axis of each said proof mass, further comprising means to tune the relative strength of said currents in said alignment coils so as to align said sensitive axes of the proof masses with respect to each other in order to minimize alignment errors.

\* \* \* \* \*